(12) United States Patent
Morita et al.

(10) Patent No.: US 7,012,372 B2
(45) Date of Patent: Mar. 14, 2006

(54) ELECTRODE-COATING GLASS COMPOSITION, COATING FOR FORMING ELECTRODE-COATING GLASS, AND PLASMA DISPLAY PANEL USING THE SAME AND ITS MANUFACTURING METHOD

(75) Inventors: Osamu Morita, Kadoma (JP); Tatsuo Mifune, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 61 days.

(21) Appl. No.: 10/338,146

(22) Filed: Jan. 7, 2003

(65) Prior Publication Data
US 2003/0155233 A1 Aug. 21, 2003

(30) Foreign Application Priority Data
Jan. 10, 2002 (JP) .............................. 2002-003761

(51) Int. Cl.
*H01J 17/49* (2006.01)
*C03C 3/64* (2006.01)

(52) U.S. Cl. ............... 313/586; 313/582; 313/635; 428/432; 428/469

(58) Field of Classification Search ............... 313/586, 313/582–585, 587, 635; 501/75, 78; 428/426, 428/469, 432
See application file for complete search history.

(56) References Cited

U.S. PATENT DOCUMENTS

| | | | |
|---|---|---|---|
| 4,288,250 A | * | 9/1981 | Yamashita ................ 501/78 |
| 6,439,943 B1 | | 8/2002 | Aoki et al. |
| 6,497,962 B1 | * | 12/2002 | Fujimine et al. ............ 428/426 |
| 6,635,193 B1 | * | 10/2003 | Fukushima et al. ...... 252/518.1 |

FOREIGN PATENT DOCUMENTS

| | | |
|---|---|---|
| JP | 11-21148 | 1/1999 |
| JP | 2001-31446 | 2/2001 |

\* cited by examiner

*Primary Examiner*—Karabi Guharay
*Assistant Examiner*—German Colón
(74) *Attorney, Agent, or Firm*—Hamre, Schumann, Mueller & Larson, P.C.

(57) ABSTRACT

An electrode-coating glass composition of the present invention satisfies $-9.5 \leq A \leq -4$, $3000 \leq B \leq 3900$ and $240 \leq C \leq 320$ in Fulcher's equation $\log\eta = A + B/(T-C)$, which defines the temperature ($T[°\text{C.}]$) dependence of viscosity ($\eta[\text{dPa·s}]$). Furthermore, the absolute value $|\Delta\log\eta|$ of the difference between values of $\log\eta$ at temperatures of 50° C. above and below a softening point is at least 4.2. Such an electrode-coating glass composition can be achieved, for example, by a glass composition containing at least one of BaO and $Al_2O_3$, and 40 to 66 wt % of PbO, 2 to 25 wt % of $SiO_2$, 5 to 40 wt % of $B_2O_3$, 0 to 20 wt % of BaO, 0 to 8 wt % of $Al_2O_3$, 0 to 2 wt % of CuO, and 0 to 2 wt % of $CeO_2$.

13 Claims, 4 Drawing Sheets

ELECTRODE-COATING GLASS COMPOSITION, COATING FOR FORMING ELECTRODE-COATING GLASS, AND PLASMA DISPLAY PANEL USING THE SAME AND ITS MANUFACTURING METHOD

BACKGROUND OF THE INVENTION

1. Field of the Invention

The present invention relates to an electrode-coating glass composition, a coating for forming an electrode-coating glass, and a plasma display panel using the same and its manufacturing method.

2. Description of Related Art

In recent years, there has been an increasing demand for large-screen high-quality television. Conventionally used CRTs (cathode-ray tubes) are better in resolution and image quality than plasma displays and liquid crystal displays, but are not suitable for a 40-inch or larger screen in terms of depth and weight. Although liquid crystal displays have excellent characteristics of low power consumption and a low drive voltage, they have a limitation in their screen size and viewing angle. On the other hand, plasma displays can achieve both a large screen and a small depth, and products on the order of 60 inches already have been developed.

FIG. 1 is a perspective view showing a configuration of an AC type plasma display panel. For facilitating an understanding, FIG. 1 shows a front plate and a back plate of the plasma display panel separately (in an unintegrated manner).

In FIG. 1, numeral 1 denotes a front plate, and numeral 2 denotes a back plate. The front plate 1 is constituted by providing display electrodes 12 and black stripes 13 on a front substrate 11, further providing a dielectric glass layer 14 that coats these display electrodes 12 and black stripes 13, and then providing a dielectric protective layer 15 thereon. The front substrate 11 is formed of, for example, borosilicate sodium glass or lead glass that is produced by a float process. The display electrodes 12 are belt-like electrodes, which are formed of, for example, ITO (indium tin oxide) and a silver (Ag) film or a chromium (Cr)—copper (Cu)—chromium (Cr) layered film. The dielectric glass layer 14 is formed using glass powder having a mean particle size of 0.1 to 20 μm, and functions as a dielectric layer of a capacitor. The dielectric protective layer 15 is formed of, for example, magnesium oxide (MgO). On the other hand, the back plate 2 is constituted by providing a plurality of address electrodes 22 on a back substrate 21, further providing a dielectric glass layer 23 that coats the address electrodes 22, and then providing barriers 24 and phosphor layers 25 thereon. The back substrate 21 is formed of glass like the front substrate 11. The address electrodes 22 are belt-like electrodes that are perpendicular to the display electrodes 12 of the front plate 1, and formed of an Ag film, a Cr—Cu—Cr layered film or the like. The barriers 24 separate the plurality of belt-like address electrodes 22 from each other so as to form a discharge space. In other words, the space between adjacent barriers serves as the discharge space in which a discharge gas is to be sealed. The phosphor layers 25 are formed from above the address electrodes 22 toward side surfaces of the barriers 24. In order to allow a color display, the phosphor layers 25 are arranged between the barriers 24 such that phosphor layers 25b, 25b and 25c of three colors that are formed of materials emitting visible light of red (R), green (G) and blue (B) are provided sequentially.

In such a plasma display panel, the dielectric glass layer 14 provided in the front plate 1 needs to have a high dielectric withstand voltage. The properties of this dielectric withstand voltage vary considerably depending on a surface condition and a film defect of the dielectric glass layer 14.

A conventionally known method for forming this dielectric glass layer 14 includes applying a paste containing glass powder, a solvent, a resin serving as a binder (in the following, referred to as a binder resin), a plasticizer and a dispersant to the display electrodes 12 of the front plate 1 by screen printing, spraying, blade coating or die coating, followed by drying and then firing.

However, in such conventional method and materials for forming the dielectric glass layer 14 that coats the display electrodes 12, since many air bubbles remain in the film, the dielectric glass layer 14 has a low transparency and is susceptible to a dielectric breakdown. Accordingly, it has been difficult to form the dielectric glass layer 14 having a high transparency and a high dielectric withstand voltage.

SUMMARY OF THE INVENTION

A first electrode-coating glass composition of the present invention is characterized in that an absolute value $|\Delta \log \eta|$ of a difference between values of $\log \eta$ at temperatures of 50° C. above and below a softening point is at least 4.2, where $\eta$ [dPa·s] is a viscosity of a glass.

A second electrode-coating glass composition of the present invention is characterized in that coefficients A, B and C satisfy $-9.5 \leq A \leq -4$, $3000 \leq B \leq 3900$, and $240 \leq C \leq 320$ in a relative equation $\log \eta = A + B/(T-C)$ defining a temperature dependence of a viscosity, where $\eta$ [dPa·s] is a viscosity of a glass and T [° C.] is a temperature.

Further, a third electrode-coating glass composition of the present invention includes at least one of barium oxide (BaO) and aluminum oxide ($Al_2O_3$), and 40 to 66 wt % of lead oxide (PbO), 2 to 25 wt % of silicon dioxide ($SiO_2$), 5 to 40 wt % of boron trioxide ($B_2O_3$), 0 to 20 wt % of barium oxide (BaO), 0 to 8 wt % of aluminum oxide ($Al_2O_3$), 0 to 2 wt % of copper oxide (CuO), and 0 to 2 wt % of ceric oxide ($CeO_2$). Herein, the percent by weight for each composition is a value obtained by expressing an oxide of each element on the basis of a stoichiometric oxide.

A coating for forming an electrode-coating glass of the present invention includes a glass powder containing any one of the first to third electrode-coating glass compositions of the present invention, a solvent, and a binder resin.

A plasma display panel of the present invention includes a front plate, and a back plate arranged so as to face the front plate. The front plate includes a front substrate, a display electrode provided on the front substrate, and a dielectric glass layer formed on a surface of the front substrate, on which the display electrode has been provided. The dielectric glass layer includes any one of the first to third electrode-coating glass compositions of the present invention.

A method for manufacturing a plasma display panel of the present invention includes (a) forming a display electrode on a front substrate, (b) applying the coating for forming an electrode-coating glass according to the present invention to a surface of the front substrate, on which the display electrode has been formed, (c) drying a coated film of the coating for forming an electrode-coating glass, and (d) firing the coated film, thus forming a dielectric glass layer.

DESCRIPTION OF THE PREFERRED EMBODIMENTS

Figure 1:
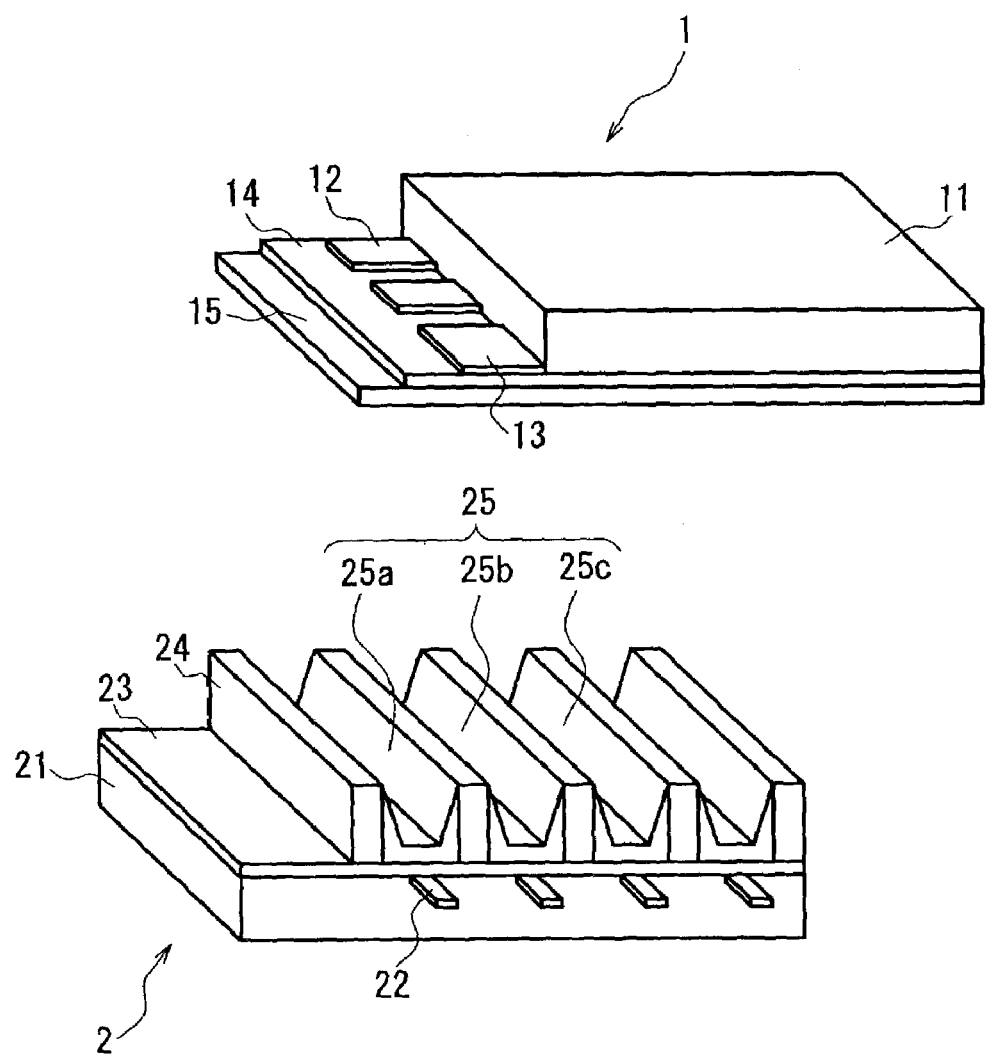
FIG. 1 is a perspective view showing a configuration of an AC type plasma display panel.

The first electrode-coating glass composition of the present invention has a large viscosity variation at temperatures above and below the softening point, i.e., the temperature at which a glass sinters, and therefore, the number of air bubbles remaining in the sintered glass film decreases, leading to a higher light transmittance. Furthermore, because of the fewer remaining air bubbles, the effective thickness of the glass film does not decrease due to the remaining air bubbles, and therefore the dielectric withstand voltage improves. Accordingly, with the first electrode-coating glass composition of the present invention, it is possible to form a glass film having a high transparency and a high dielectric withstand voltage.

The second electrode-coating glass composition of the present invention has a large viscosity variation at temperatures above and below the softening point, and the number of air bubbles remaining in the sintered glass film decreases. Accordingly, the second electrode-coating glass composition of the present invention can form a glass film having a high transparency and a high dielectric withstand voltage, as the first electrode-coating glass composition of the present invention. Moreover, for achieving a still better effect, it is preferable in the second electrode-coating glass composition of the present invention that the coefficient A in the relative equation $\log\eta = A + B/(T-C)$ satisfies $-8 \leq A \leq -6$. It also is preferable that the coefficient B satisfies $3300 \leq B \leq 3700$. Further, it is preferable that the coefficient C satisfies $260 \leq C \leq 300$.

The third electrode-coating glass composition of the present invention has smaller ratios of PbO and $SiO_2$ than a conventional electrode-coating glass composition and always contains at least one of BaO and $Al_2O_3$. According to this third electrode-coating glass composition, it is possible to form a glass film having a high transparency and a high dielectric withstand voltage. Moreover, for achieving a still better effect, it is preferable in the third electrode-coating glass composition of the present invention that the total content of BaO and $Al_2O_3$ is at least 5 wt %.

Also, in the first to third electrode-coating glass compositions of the present invention, it is preferable to have a softening point of no more than 600° C., for achieving a lower softening point than a glass serving as a substrate.

Furthermore, in the first to third electrode-coating glass compositions of the present invention, it is preferable to have a coefficient of thermal expansion at 30° C. to 300° C. of $68 \times 10^{-7}$/° C. to $86 \times 10^{-7}$/° C., for reducing the difference in the coefficient of thermal expansion between the electrode-coating glass compositions and the glass serving as the substrate, thereby preventing the glass film from cracking owing to a distortion caused by this difference in the coefficient of thermal expansion.

Next, the coating for forming an electrode-coating glass of the present invention will be described. In accordance with the coating for forming an electrode-coating glass of the present invention, it is possible to form a glass film having a high transparency and a high dielectric withstand voltage on an electrode by conventional screen printing, spraying, blade coating or die coating. Also, in the coating for forming an electrode-coating glass of the present invention, it is preferable that the glass powder has a maximal particle size of 16 µm and a particle size distribution with its peaks in ranges of 0.9 to 1.3 µm and 5 to 6 µm. With such a glass powder, glass particles accumulate densely when forming a coated film (a dried film), so that unwanted spaces decrease and fewer air bubbles remain. Accordingly, it becomes possible to form a glass film having a still higher light transmittance and a still higher dielectric withstand voltage.

Next, the plasma display panel of the present invention will be described. In accordance with the plasma display panel of the present invention, the light transmittance and the dielectric withstand voltage of the dielectric glass layer improve, so that a plasma display panel having high brightness and high reliability can be provided.

Further, the manufacturing method of a plasma display panel of the present invention will be described. In accordance with the manufacturing method of the plasma display panel of the present invention, a plasma display panel having high brightness and high reliability can be manufactured. Also, in the manufacturing method of a plasma display panel of the present invention, it is preferable that the coated film is dried at 70° C. to 110° C., and that the coated film is fired at 500° C. to 600° C.

The following is a description of preferred embodiments of the present invention, with reference to the accompanying drawings.

An electrode-coating glass composition of the present embodiment is used suitably for forming a dielectric glass layer that coats display electrodes of a plasma display panel. Since the configuration of the plasma display panel of the present embodiment is similar to that of the above-described plasma display panel shown in FIG. 1, the description thereof will be omitted here.

In general, the dependence of viscosity on temperature, namely, the temperature (T)-viscosity (η) relationship of glass is expressed by the following relative equation (Fulcher's equation):

$$\log\eta = A + B/(T-C) \tag{1}$$

wherein A, B and C respectively represent coefficients obtained by experiments.

In the electrode-coating glass composition used in the present embodiment, the coefficients A, B and C obtained by experiments satisfy $-9.5 \leq A \leq -4$, $3000 \leq B \leq 3900$ and $240 \leq C \leq 320$ in this Fulcher's equation. It is more preferable to use a glass composition satisfying $-8 \leq A \leq -6$, $3300 \leq B \leq 3700$ and $260 \leq C \leq 300$.

When the coefficients A, B and C in Fulcher's equation satisfy the above-mentioned numerical range, the electrode-coating glass composition of the present embodiment has a larger viscosity variation above and below the temperature at which a glass sinters, i.e., a softening point of the glass, so that the number of air bubbles remaining in the sintered glass film decreases. Consequently, the formed glass film has a higher light transmittance, and thus, has a higher transparency. Furthermore, because of the fewer remaining air bubbles, the effective thickness of the formed glass film does not decrease, and therefore, the dielectric withstand voltage of the glass film improves. Accordingly, with the electrode-coating glass composition of the present embodiment, it is possible to form a glass film having a high transparency and a high dielectric withstand voltage.

In the present embodiment, for the purpose of obtaining fully the effects described above, the electrode-coating glass composition is prepared so that the degree of viscosity variation above and below the softening point of glass satisfies the following conditions: the absolute value of the difference between the values of log$\eta$ at temperatures of 50° C. above and below the softening point, i.e., |$\Delta$log$\eta$| is at least 4.2. Also, it is preferable that |$\Delta$log$\eta$| is not greater than 10. This is because, when the variation in viscosity near the softening point is too large, the firing temperature becomes difficult to control owing to problems in that even a temperature slightly lower than a set firing temperature causes an insufficient firing and even a temperature slightly higher than the set firing temperature causes an excessive reaction with electrodes.

The following is a description of how to determine the coefficient A, B and C in Fulcher's equation. The coefficient A, B and C in Fulcher's equation are calculated using a measurement value obtained by measuring glass viscosity at each temperature by a measuring method according to the temperature range. In a high temperature range (1000° C. to 1550° C.), the viscosity can be measured by a sample draw-down method. In a medium temperature range (300° C. to 1000° C.), the viscosity can be measured by a penetration method. In a low temperature range (500° C. or lower), the viscosity can be measured by a beam bending method. The principles of these measuring methods are as follows.

1) Sample Draw-down Method

Figure 2:
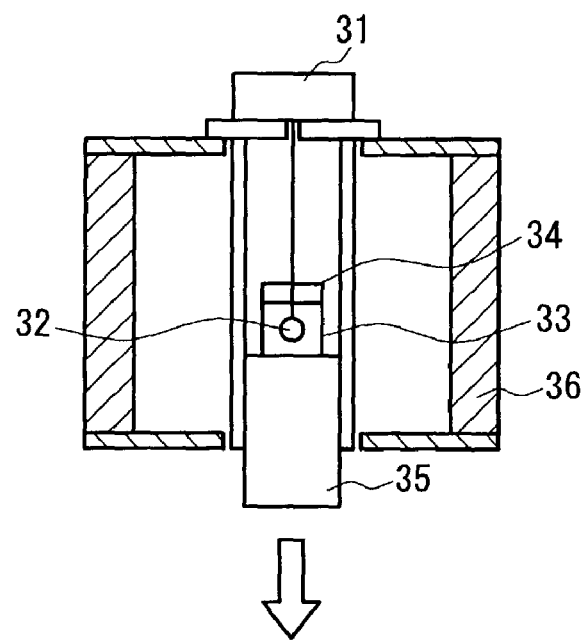
FIG. 2 illustrates how to measure a viscosity by a sample draw-down method, which is a method for measuring the viscosity of a glass in a high temperature range.

During a vertical motion of a ball (a platinum (Pt) ball) in molten glass, the load imposed on the ball is measured with an electronic force balance connected to this ball, and the viscosity is calculated using this load. As shown in FIG. 2, a Pt ball 32 connected to an electronic force balance 31 is put in a crucible 34 containing molten glass 33, which is a sample to be measured, and then a sample receiving stand 35 is drawn down at a constant velocity, thereby lowering the crucible 34. This allows the Pt ball 32 to rise relatively in the molten glass 33 at a constant velocity, and the load imposed on the Pt ball 32 at this time is measured with the electronic force balance 31. This measurement is carried out in an electric furnace 36 that is controlled within the high temperature range. In this manner, when the Pt ball 32 moves at a constant velocity in the molten glass 33, the viscosity is calculated by Stokes' law with the following equation:

$$\eta = GW/v \tag{2}$$

wherein G represents an apparatus constant, W represents a load and v represents a movement velocity of the Pt ball. The apparatus constant G is obtained by a measurement of a standard sample whose viscosity is known.

2) Penetration Method

Figure 3:
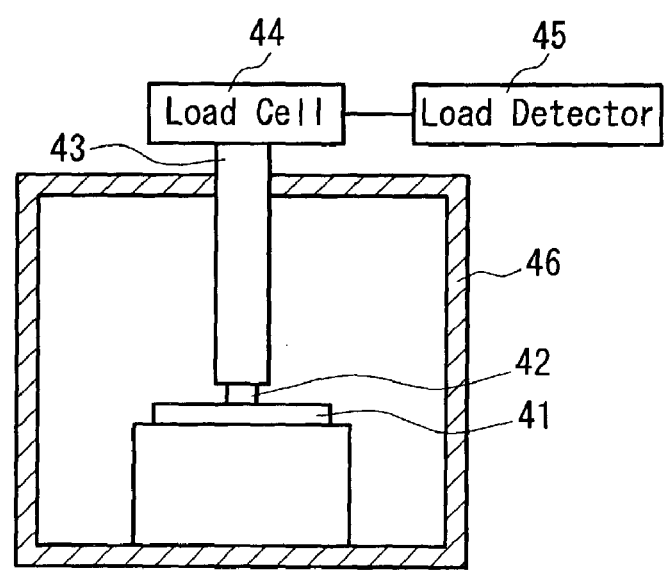
FIG. 3 illustrates how to measure a viscosity by a penetration method, which is a method for measuring the viscosity of a glass in a medium temperature range.

As shown in FIG. 3, a penetrating indenter 42 is pressed against a flat-plate sample 41 with a certain load (for example, pushed in by 0.5 mm), and the viscosity of the sample 41 is calculated from the penetrating velocity of this penetrating indenter 42 by the equation below. The penetrating indenter 42 is connected to a load cell 44 via a penetrating rod 43, and this load cell 44 is connected with a load detector 45. This measurement is carried out in an electric furnace 46 that is controlled within the medium temperature range.

$$\eta = GWL \tag{3}$$

wherein G represents an apparatus constant, W represents a load and L represents a function of penetrating velocity. The apparatus constant G is obtained by a measurement of a standard sample whose viscosity is known.

3) Beam Bending Method

Figure 4:
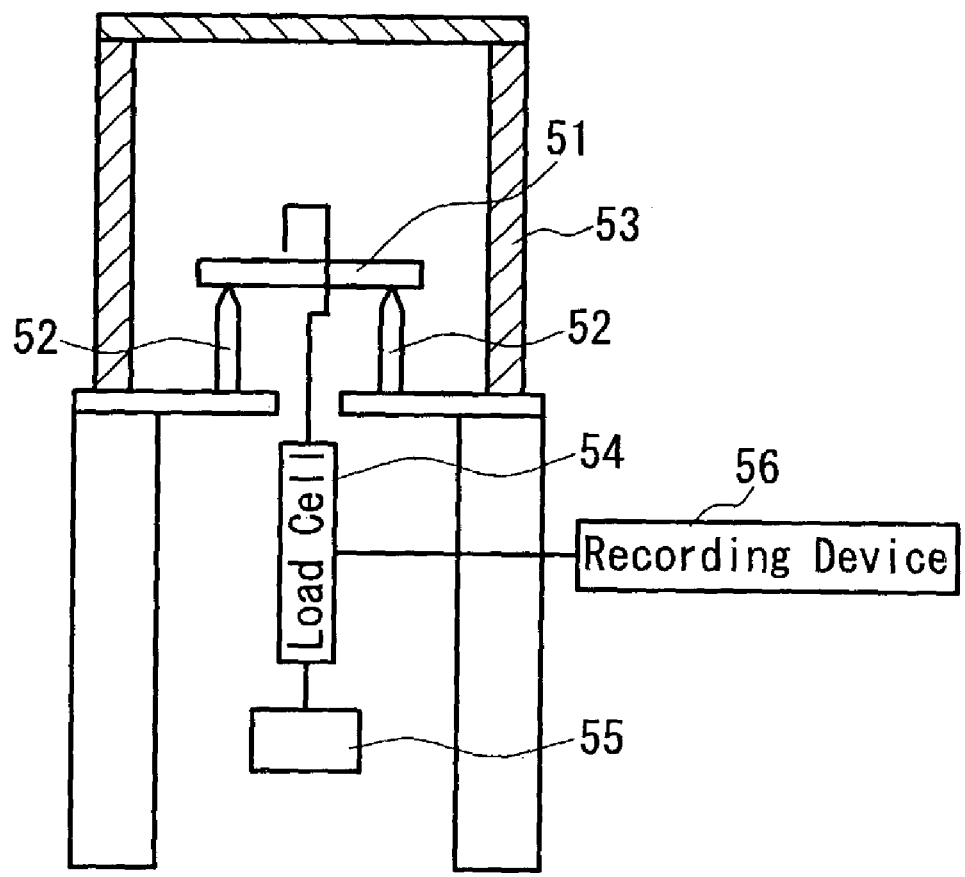
FIG. 4 illustrates how to measure a viscosity by a beam bending method, which is a method for measuring the viscosity of a glass in a low temperature range.

As shown in FIG. 4, a plate sample piece 51 is bent at three points, and the viscosity of the sample piece 51 is calculated by the equation below. The three-point bending is carried out by using members 52 as fulcrums and imposing a load 55 on the center of the sample piece 51. The load 55 is connected to a load cell 54, which is connected with a recording device 56. This measurement is carried out in an electric furnace 53 that is controlled within the low temperature range.

$$\eta = \{(3\ gL)/(2.4\ I_C v)\} \times (M + \rho AL/1.6) \tag{4}$$

wherein g represents gravitational acceleration, L represents the distance between the fulcrums, $I_C$ represents geometrical moment of inertia, M represents a load, $\rho$ represents a sample density, v represents a flexure velocity of a central portion of the sample and A represents a cross-sectional area of the sample.

Furthermore, the electrode-coating glass composition in which the coefficients A, B and C in Fulcher's equation satisfy the above-mentioned numerical range can be achieved, for example, by a glass composition containing at least one of BaO and $Al_2O_3$, and 40 to 66 wt % (preferably 40 to 50 wt %, and more preferably 40 to 47 wt %) of PbO, 2 to 25 wt % (preferably 2 to 9 wt %, and more preferably 5 to 8.5 wt %) of $SiO_2$, 5 to 40 wt % (preferably 20 to 30 wt %, and more preferably 20 to 27 wt %) of $B_2O_3$, 0 to 20 wt % (preferably 10 to 20 wt %, and more preferably 15 to 19 wt %) of BaO, 0 to 8 wt % (preferably 1 to 7 wt %, and more preferably 3 to 6.5 wt %) of $Al_2O_3$, 0 to 2 wt % (preferably 0.1 to 1 wt %, and more preferably 0.1 to 0.4 wt %) of CuO, and 0 to 2 wt % (preferably 0.1 to 1 wt %, and more preferably 0.1 to 0.4 wt %) of $CeO_2$. The total content of BaO and $Al_2O_3$ accounts for preferably at least 5 wt %, more preferably 10 to 28 wt %, and further preferably 20 to 25 wt %. It should be noted that the present invention includes a glass composition satisfying the above-described A to C other than the above-listed compositions.

The following is a description of how to form the dielectric glass layer 14 that coats the display electrodes 12 of the plasma display panel as shown in FIG. 1 using the glass composition of the present embodiment.

First, a paste (a coating for forming an electrode-coating glass) containing glass powder formed of the electrode-coating glass composition of the present embodiment, a solvent and a binder resin is prepared. At this time, the glass powder is prepared to have a maximal particle size of not more than 16 μm and a particle size distribution with its peaks in the ranges of 0.9 to 1.3 μm and 5 to 6 μm. This paste is applied to the front substrate 11 on which the display electrodes 12 have been formed, by screen printing, spraying, blade coating or die coating. The applied coating is dried with a far-infrared dryer, a hot plate or a hot-blast dryer at 70° C. to 110° C., followed by firing at 500° C. to 600° C., thus forming the dielectric glass layer 14.

The solvent in the paste can be, for example, one or a mixture of two or more selected from terpenes such as α-, β- and γ-terpineol, ethylene glycol monoalkyl ethers, ethylene glycol dialkyl ethers, diethylene glycol monoalkyl ethers, diethylene glycol dialkyl ethers, ethylene glycol monoalkyl ether acetates, ethylene glycol dialkyl ether acetates, diethylene glycol monoalkyl ether acetates, diethylene glycol dialkyl ether acetates, propylene glycol monoalkyl ethers, propylene glycol dialkyl ethers, propylene glycol monoalkyl ether acetates, propylene glycol dialkyl ether acetates, and alcohols such as methanol, ethanol, isopropanol and 1-butanol.

The binder resin in the paste can be, for example, one or a combination of two or more selected from cellulose resins such as nitrocellulose, ethyl cellulose and hydroxyethyl cellulose, acrylic resins such as polybutylacrylate, polymethacrylate, polyvinyl alcohol and polyvinyl butyral.

Furthermore, a dispersant and a plasticizer also can be added to this paste for forming an electrode-coating glass as necessary.

The dielectric glass layer 14 formed as above has a high dielectric withstand voltage and a very high light transmittance.

Moreover, it is preferable that the softening point of the electrode-coating glass composition is no more than 600° C. so as to be lower than the softening point of the glass serving as the substrate. It is further preferable that it is at least 500° C. so as not to be lower than the temperature for sealing the front and back plates. Also, it is preferable that the electrode-coating glass composition has a coefficient of thermal expansion at 30° C. to 300° C. of $68 \times 10^{-7}/°$ C. to $86 \times 10^{-7}/°$ C. in order to prevent cracking owing to a distortion caused by the difference in the coefficient of thermal expansion between the electrode-coating glass composition and the glass serving as the substrate.

EXAMPLE

In the following, the present invention will be described more specifically by way of examples.

Examples 1 to 13 and Comparative Examples 1 to 3

Table 1 shows composition ratios (percent by weight relative to oxide) of glass powder used as the electrode-coating glass compositions in Examples 1 to 13 and Comparative examples 1 to 3.

The viscosity of each sample was measured by the sample draw-down method in the high temperature range, the penetration method in the medium temperature range and the beam bending method in the low temperature range. From the results of these measurements, the coefficients A, B and C in Fulcher's equation were calculated for each of the glass compositions of Examples 1 to 13 and Comparative examples 1 to 3. Table 1 also shows these results.

TABLE 1

| | Glass composition (wt %) | | | | | | | | | Fulcher's equation | | |
|---|---|---|---|---|---|---|---|---|---|---|---|---|
| | PbO | SiO$_2$ | B$_2$O$_3$ | BaO | Al$_2$O$_3$ | CuO | CeO$_2$ | MgO | CaO | A | B | C |
| Ex. 1 | 52.3 | 14.2 | 14.6 | 16.2 | 2.6 | 0.1 | — | — | — | −8.6 | 3788.2 | 305.6 |
| Ex. 2 | 43.7 | 9.1 | 25.7 | 18.2 | 3.1 | 0.2 | — | — | — | −5.2 | 3357.8 | 289.4 |
| Ex. 3 | 55.6 | 12.4 | 18.4 | 12.6 | 1.0 | — | — | — | — | −7.5 | 3890.3 | 265.6 |
| Ex. 4 | 58.1 | 16.5 | 15.2 | 5.6 | 4.3 | 0.3 | — | — | — | −6.5 | 3688.9 | 290.7 |
| Ex. 5 | 44.1 | 9.4 | 23.6 | 17.5 | 5.3 | — | 0.1 | — | — | −5.7 | 3234.8 | 312.6 |
| Ex. 6 | 61.3 | 20.1 | 7.3 | 8.6 | 2.7 | — | — | — | — | −9.3 | 3853.8 | 315.7 |
| Ex. 7 | 41.2 | 8.7 | 27.8 | 17.5 | 4.3 | 0.5 | — | — | — | −4.3 | 3073.2 | 312.5 |
| Ex. 8 | 42.2 | 8.1 | 28.4 | 16.0 | 4.8 | — | 0.5 | — | — | −6.6 | 3874.0 | 298.2 |
| Ex. 9 | 64.9 | 24.3 | 6.1 | — | 4.7 | — | — | — | — | −5.8 | 3765.9 | 265.6 |
| Ex. 10 | 65.2 | 10.7 | 21.4 | — | 2.7 | — | — | — | — | −8.5 | 3638.6 | 307.9 |
| Ex. 11 | 64.3 | 23.4 | 7.7 | 4.6 | — | — | — | — | — | −4.1 | 3327.8 | 268.9 |
| Ex. 12 | 65.3 | 9.8 | 22.3 | 2.6 | — | — | — | — | — | −9.5 | 3759.4 | 304.5 |
| Ex. 13 | 60.5 | 20.0 | 14.5 | — | 5.0 | — | — | — | — | −7.8 | 3682.2 | 318.1 |
| Comp. ex. 1 | 67.5 | 28.3 | 2.4 | — | — | — | — | 1.8 | — | −2.7 | 3320.5 | 244.9 |
| Comp. ex. 2 | 61.4 | 25.4 | 6.2 | 0.5 | — | — | — | — | 6.5 | −4.6 | 4115.5 | 249.0 |
| Comp. ex. 3 | 42.3 | 34.2 | 8.1 | — | 6.2 | — | — | — | 9.2 | −5.7 | 4467.7 | 267.5 |

Furthermore, the softening point was calculated using Fulcher's equation, and then the absolute value of the difference between the values of log η at temperatures of 50° C. above and below this softening point, i.e., |Δlog η| was calculated. The results are shown in Table 2. It should be noted that the softening point is a temperature when the viscosity is $10^{7.65}$ dPa·s.

TABLE 2

| | Softening point (° C.) | |Δlog η| |
|---|---|---|
| Example 1 | 538.7 | 7.31 |
| Example 2 | 550.7 | 5.10 |
| Example 3 | 522.4 | 6.13 |
| Example 4 | 551.4 | 5.63 |
| Example 5 | 554.9 | 5.75 |
| Example 6 | 542.0 | 7.91 |
| Example 7 | 569.7 | 4.83 |
| Example 8 | 570.1 | 5.43 |
| Example 9 | 545.6 | 4.96 |

TABLE 2-continued

|  | Softening point (° C.) | \|Δlogη\| |
|---|---|---|
| Example 10 | 533.2 | 7.54 |
| Example 11 | 552.1 | 4.28 |
| Example 12 | 523.7 | 8.25 |
| Example 13 | 556.4 | 6.78 |
| Comp. example 1 | 565.7 | 3.31 |
| Comp. example 2 | 585.0 | 3.73 |
| Comp. example 3 | 602.2 | 4.08 |

As becomes clear from Table 1, the glass compositions of Examples 1 to 13 satisfied $-9.5 \leq A \leq -4$, $3000 \leq B \leq 3900$ and $240 \leq C \leq 320$ in this Fulcher's equation. On the other hand, in the glass compositions of Comparative examples 1 to 3, any of A, B and C did not fall within the above-mentioned numerical range.

Further, as becomes clear from Table 2, |Δlogη| was at least 4.2 in the glass compositions of Examples 1 to 13, while |Δlogη| was smaller than 4.2 in the glass compositions of Comparative examples 1 to 3.

The coefficient of thermal expansion, the dielectric withstand voltage and the total transmittance of each of the glass compositions of Examples 1 to 13 and Comparative examples 1 to 3 were calculated.

The coefficient of thermal expansion at 30° C. to 300° C. was measured with a thermomechanical analyzer (TMA), manufactured by Rigaku Corporation. A sintered body of the glass powder was processed into 5 mm×5 mm×30 mm, and was subjected to a 10 g load while raising the temperature at 5° C./min. At this time, the change in shape was measured, thus calculating the coefficient of thermal expansion. As described above, it is preferable that the coefficient of thermal expansion at 30° C. to 300° C. is $68 \times 10^{-7}$/° C. to $86 \times 10^{-7}$/° C.

The dielectric withstand voltage was measured as follows. First, a glass paste was prepared using each of the glass compositions of Examples 1 to 13 and Comparative examples 1 to 3. More specifically, the glass powder with a composition of each of the Examples and Comparative examples was used, ethyl cellulose was used as the binder resin, and α-terpineol was used as the solvent. The glass paste was prepared by blending 65 wt % of the glass powder, 4 wt % of ethyl cellulose and 31 wt % of a-terpineol, mixing and dispersing these components uniformly with a three-roller disperser. Next, a 42-inch glass substrate was prepared as the front substrate, and Ag electrodes as the display electrodes were formed on this glass substrate. Further, the glass paste was applied by die coating to the glass substrate on which the Ag electrodes had been formed, and then this coated film was dried at 100° C., followed by firing at 585° C., thus obtaining the dielectric glass layer. With respect to this dielectric glass layer of the front plate as formed above, a dielectric test was performed. In the dielectric test of the dielectric glass layer, the front plate was disposed on a metal plate (an aluminum plate was used in this case), a rare gas (a neon gas was used in this case) was placed between the front plate and the metal plate, and an AC voltage was applied with the display electrodes being positive electrodes and the metal plate being a negative electrode. At this time, the dielectric withstand voltage (V) per a thickness of 1 μm of the dielectric glass layer was measured, with the acceptance criteria being set at 100 V/μm.

The total transmittance was measured as follows. First, a glass paste was prepared as in the case of measuring the dielectric withstand voltage. Next, using this glass paste, a 30 μm thick glass film was produced on a glass substrate that is not provided with any electrode, in a manner similar to that for measuring the dielectric withstand voltage. The total transmittance of this 30 μm thick glass film at a wavelength of 550 nm was measured with a spectral colorimeter, manufactured by Minolta Co., Ltd. The acceptance criteria for this test were at least 85% for VGA (video graphics array) and 90% for XGA (extended graphics array).

The results of the measurements are shown in Table 3.

TABLE 3

|  | Coefficient of thermal expansion ($\times 10^{-7}$/° C.) | Dielectric withstand voltage (V/μm) | Total transmittance (%) | Evaluation |
|---|---|---|---|---|
| Example 1 | 74 | 105 | 86 | Good |
| Example 2 | 77 | 108 | 86 | Good |
| Example 3 | 76 | 104 | 86 | Good |
| Example 4 | 79 | 108 | 87 | Good |
| Example 5 | 77 | 116 | 87 | Good |
| Example 6 | 76 | 122 | 89 | Good |
| Example 7 | 75 | 130 | 93 | Excellent |
| Example 8 | 75 | 130 | 89 | Good |
| Example 9 | 70 | 105 | 86 | Good |
| Example 10 | 68 | 103 | 86 | Good |
| Example 11 | 71 | 109 | 87 | Good |
| Example 12 | 69 | 108 | 86 | Good |
| Example 13 | 70 | 102 | 86 | Good |
| Comp. example 1 | 73 | 67 | 86 | Bad |
| Comp. example 2 | 78 | 130 | 80 | Bad |
| Comp. example 3 | 80 | 87 | 78 | Bad |

As shown in Table 3, the glass compositions of Examples 1 to 13 had a dielectric withstand voltage of at least 100 V/μm and a total transmittance of at least 85%. Furthermore, the glass composition of Example 7 had a total transmittance of more than 90%. In contrast, none of the glass compositions of Comparative examples 1 to 3 satisfied both the dielectric withstand voltage of at least 100 V/μm and the total transmittance of at least 85%. Moreover, Examples 1 to 13 also satisfied both the coefficient of thermal expansion at 30° C. to 300° C. of $68 \times 10^{-7}$/° C. to $86 \times 10^{-7}$/° C. and the softening point of 600° C. or lower.

Examples 14 to 19

Figure 5:
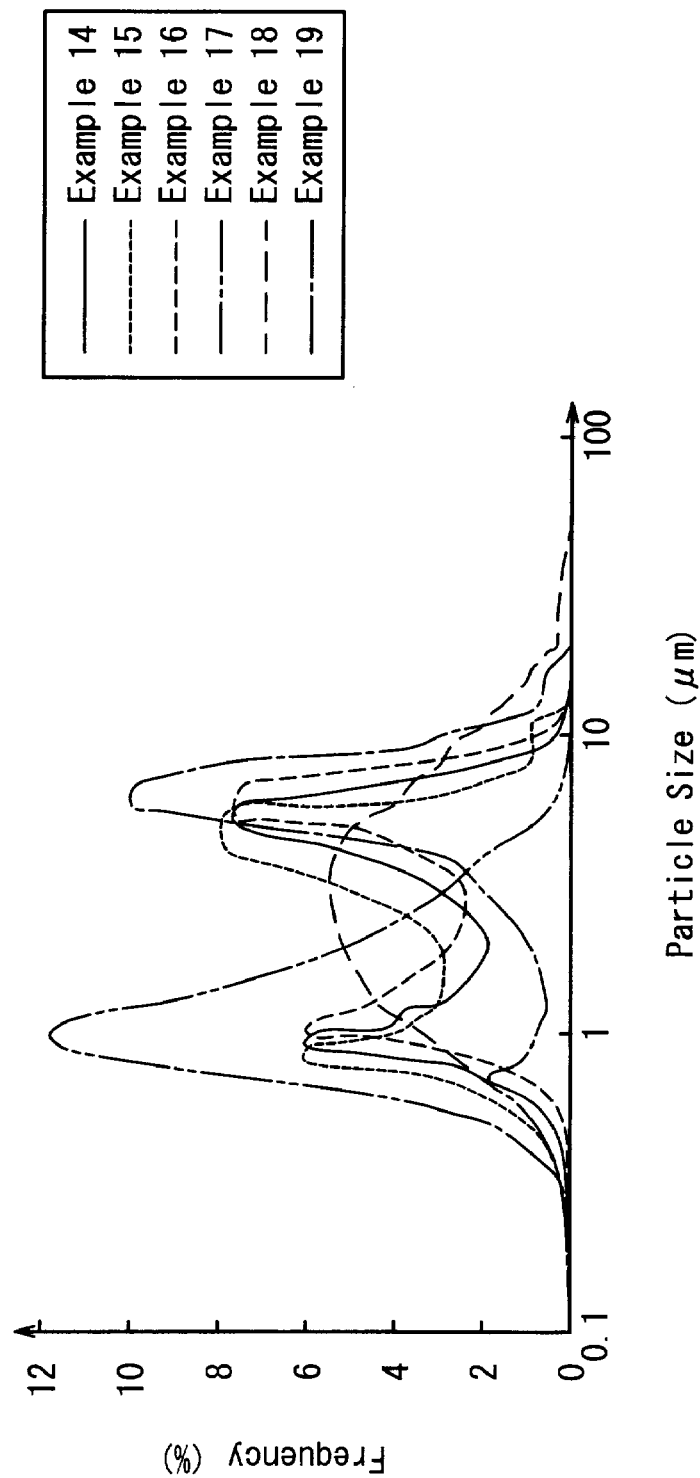
FIG. 5 is a graph showing a particle size distribution of glass compositions of Examples 14 to 19 of the present invention.

FIG. 5 shows a particle size distribution of glass compositions of Examples 14 to 19. The particle size of each glass powder was adjusted to have a predetermined distribution by using a classifier manufactured by Nisshin Engineering Inc. It should be noted that the glass compositions of Examples 14 to 19 all had the same composition, which is the composition of Example 7 shown in Table 1. Table 4 shows the results of measuring various characteristics of the glass compositions of Examples 14 to 19 by the same method as in the Examples 1 to 13 and Comparative examples 1 to 3.

TABLE 4

|  | Coefficient of thermal expansion ($\times 10^{-7}$/° C.) | Dielectric withstand voltage (V/μm) | Total transmittance (%) | Evaluation |
|---|---|---|---|---|
| Example 14 | 75 | 130 | 93 | Excellent |
| Example 15 | 75 | 130 | 92 | Excellent |
| Example 16 | 75 | 128 | 92 | Excellent |
| Example 17 | 75 | 105 | 88 | Good |
| Example 18 | 75 | 104 | 86 | Good |
| Example 19 | 75 | 106 | 87 | Good |

According to the particle size distribution of FIG. 5 and the measurement results of Table 4, it was confirmed that a dielectric glass layer with better characteristics can be obtained when using the glass powders of Examples 14 to 16, which had a maximal particle size of not more than 16 μm and a particle size distribution with its peaks in the ranges of 0.9 to 1.3 μm and 5 to 6 μm.

As described above, in accordance with the electrode-coating glass composition and the coating for forming an electrode-coating glass of the present invention, it is possible to form a glass film having a high transparency and a high dielectric withstand voltage. Furthermore, in accordance with the plasma display panel and its manufacturing method of the present invention, it is possible to provide a plasma display panel having high brightness and high reliability.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An electrode-coating glass composition, wherein an absolute value $|\Delta \log \eta|$ of a difference between values of $\log \eta$ at temperatures of 500° C. above and below a softening point is at least 4.2, where $\eta$ is a viscosity of a glass, the viscosity $\eta$ is measured in [dPa·s] units,
   wherein the glass composition has a total transmittance of at least 85% and comprises:
      at least one of barium oxide (BaO) and aluminum oxide ($Al_2O_3$);
      40 to 66 wt % of lead oxide (PbO),
      2 to 25 wt % of silicon dioxide ($SiO_2$),
      5 to 40 wt % of boron trioxide ($B_2O_3$),
      0 to 20 wt % of barium oxide (BaO),
      0 to 8 wt % of aluminum oxide ($Al_2O_3$),
      0 to 2 wt % of copper oxide (CuO),
      0 to 2 wt % of ceric oxide ($CeO_2$), and
      does not contain calcium oxide (CaO) or magnesium oxide (MgO), and the glass composition is in a powder form, further comprising:
      a solvent; and
      a binder resing, and
   wherein the glass powder has a maximal particle size of not more than 16 μm and a particle size distribution with its peaks in ranges of 0.9 to 1.3 μm and 5 to 6 μm.

2. The electrode-coating glass composition according to claim 1, wherein a total content of BaO and $Al_2O_3$ is at least 5 wt %.

3. The electrode-coating glass composition according to claim 1, which has a softening point of no more than 600° C.

4. The electrode-coating glass composition according to claim 1, having a coefficient of thermal expansion at 30° C. to 300° C. of $68 \times 10^{-7}$/° C. to $86 \times 10^{-7}$/° C.

5. A plasma display panel comprising:
   a front plate; and
   a back plate arranged so as to face the front plate;
   wherein the front plate comprises
      a front substrate,
      a display electrode provided on the front substrate, and
      a dielectric glass layer formed on a surface of the front substrate, on which the display electrode has been provided, and
   the dielectric glass layer comprises the electrode-coating glass composition according to claim 1.

6. An electrode-coating glass composition, wherein coefficients A, B and C satisfy
   $-9.5 \leq A \leq -4$,
   $3000 \leq B \leq 3900$, and
   $240 \leq C \leq 320$
in a relative equation $\log \eta = A + B/(T-C)$ defining a temperature dependence of a viscosity, where $\eta$ is a viscosity of a glass, the viscosity $\eta$ is measured in [dPa·s] units, and T [° C.] is a temperature,
   wherein the glass composition has a total transmittance of at least 85% and comprises:
      at least one of barium oxide (BaO) and aluminum oxide ($Al_2O_3$);
      40 to 66 wt % of lead oxide (PbO),
      2 to 25 wt % of silicon dioxide ($SiO_2$),
      5 to 40 wt % of boron trioxide ($B_2O_3$),
      0 to 20 wt % of barium oxide (BaO),
      0 to 8 wt % of aluminum oxide ($Al_2O_3$),
      0 to 2 wt % of copper oxide (CuO),
      0 to 2 wt % of ceric oxide ($CeO_2$), and
      does not contain calcium oxide (CaO) or magnesium oxide (MgO), and the glass composition is in a powder form, further comprising:
      a solvent; and
      a binder resin, and
   wherein the glass powder has a maximal particle size of not more than 16 μm and a particle size distribution with its peaks in ranges of 0.9 to 1.3 μm and 5 to 6 μm.

7. The electrode-coating glass composition according to claim 6, wherein the coefficient A satisfies $-8 \leq A \leq -6$.

8. The electrode-coating glass composition according to claim 6, wherein the coefficient B satisfies $3300 \leq B \leq 3700$.

9. The electrode-coating glass composition according to claim 6, wherein the coefficient C satisfies $260 \leq C \leq 300$.

10. The electrode-coating glass composition according to claim 6, which has a softening point of no more than 600° C.

11. The electrode-coating glass composition according to claim 6, having a coefficient of thermal expansion at 30° C. to 300° C. of $68 \times 10^{-7}$/° C. to $86 \times 10^{-7}$/° C.

12. A plasma display panel comprising:
    a front plate; and
    a back plate arranged so as to face the front plate;
    wherein the front plate comprises
       a front substrate,
       a display electrode provided on the front substrate, and
       a dielectric glass layer formed on a surface of the front substrate, on which the display electrode has been provided, and
    the dielectric glass layer comprises the electrode-coating glass composition according to claim 6.

13. The electrode-coating glass composition according to claim 6, wherein a total content of BaO and $Al_2O_3$ is at least 5%.

* * * * *

UNITED STATES PATENT AND TRADEMARK OFFICE
CERTIFICATE OF CORRECTION

PATENT NO. : 7,012,372 B2 Page 1 of 1
APPLICATION NO. : 10/338146
DATED : March 14, 2006
INVENTOR(S) : Morita et al.

It is certified that error appears in the above-identified patent and that said Letters Patent is hereby corrected as shown below:

Column 11, line 24 (claim 1): "500" should read --50--.
Column 11, line 43 (claim 1): "resing" should read --resin--.

Signed and Sealed this

Twenty-ninth Day of April, 2008

JON W. DUDAS
*Director of the United States Patent and Trademark Office*